United States Patent [19]

Kleykamp

[11] Patent Number: 4,644,874
[45] Date of Patent: Feb. 24, 1987

[54] HATCH COVER FOR HOPPER CARS

[75] Inventor: Donald L. Kleykamp, Washington Township, Montgomery County, Ohio

[73] Assignee: Dayco Products, Inc., Dayton, Ohio

[21] Appl. No.: 765,777

[22] Filed: Aug. 15, 1985

[51] Int. Cl.4 .............................................. B61D 39/00
[52] U.S. Cl. ..................................... 105/377; 220/314
[58] Field of Search ...................... 105/377, 247, 248; 264/271.1, 273; 220/71, 314, 1.5, 1 T

[56] References Cited

U.S. PATENT DOCUMENTS

| | | | |
|---|---|---|---|
| 2,213,708 | 9/1940 | Lange | 264/271.1 |
| 2,661,974 | 12/1953 | Zehnder | 220/314 |
| 2,816,683 | 12/1957 | Miers et al. | 220/314 |
| 3,355,534 | 11/1967 | Groff | 264/273 |
| 3,789,776 | 2/1974 | Funkey | 105/377 |
| 4,126,094 | 11/1978 | Zimmerle et al. | 105/377 |
| 4,171,061 | 10/1979 | Burroughs et al. | 105/377 |
| 4,249,665 | 2/1981 | Kleykamp | 213/61 |
| 4,300,698 | 11/1981 | Williamson, Jr. | 220/71 |
| 4,304,032 | 12/1981 | MacMillan et al. | 264/271.1 |
| 4,388,873 | 6/1983 | Carleton et al. | 220/314 |
| 4,407,427 | 10/1983 | Reuter | 220/1 T |
| 4,550,849 | 11/1985 | Adsit | 220/1 T |

FOREIGN PATENT DOCUMENTS

| | | | |
|---|---|---|---|
| 599626 | 6/1960 | Canada | 220/314 |
| 45910 | 10/1959 | France | 264/271.1 |

OTHER PUBLICATIONS

Index of Plastic Technology, Mar. 1983.
The Car and Locomotive Cyclopedia, Simmons-Boardman, fourth edition, 1980.
Plastics Technology, Mar. 1983, pp. 37–44.

Primary Examiner—Robert B. Reeves
Assistant Examiner—Dennis C. Rodgers
Attorney, Agent, or Firm—Joseph V. Tassone

[57] ABSTRACT

The present invention relates to a hatch cover for hopper cars, the hatch cover being made substantially of polymeric materials. The hatch cover of the invention comprises a lid having an inside and outside surface, a rim defining the edges of the inside surface, and a locking arm fixedly attached to the outside surface. A flat piece of metal is embedded in the lid having its geometric center substantially coincident with the geometric center of the lid to provide reinforcement therefor. The locking arm is reinforced with a steel channel for rigidity. The locking arm is attached to the lid using a single bolt which connects the channel of the locking arm with the flat piece of metal of the lid. A method of making the hatch cover is provided which comprises making the lid and the locking arm in the desired shape by reaction injection molding a polymeric material around the flat piece of metal and the channel respectively.

5 Claims, 6 Drawing Figures

HATCH COVER FOR HOPPER CARS

BACKGROUND OF THE INVENTION

1. Field of the Invention

The present invention relates to a hatch cover for hopper cars and a method of making the same.

2. Information Disclosure Statement

In general, hopper cars are used primarily to transport commodities which are perishable or require protection from contamination and the weather, or to provide a method of transporting materials that may be hazardous to the environment. Hopper cars are used in the chemical and petrochemical industries to transport chemicals, in the farming industry to transport grain, and in other industries to transport bulk materials such as cement. Hopper cars are characterized, because of the types of materials that are carried in them, by the fact that materials are loaded into the top of the car instead of through doors on the side, as was the case, for example, in box cars. It has been found to be most convenient to provide hatches in the top of hopper cars for loading the transported materials. To provide the kind of integrity needed to transport the types of materials listed above, hatch covers must be provided which are strong and provide a good hatch seal.

Although a number of hatch configurations are known in the art, hatches for hopper cars are generally round in shape as is illustrated in, for example, "The Car and Locomotive Cyclopedia", 4th edition, Simmons-Boardman, 1980. In the prior art, hatch covers have generally been made of cast aluminum, steel, or fiberglass, but these materials have certain disadvantages. Hatch covers of cast aluminum are expensive to make and are brittle, and are therefore easily broken. Hatch covers made of steel are expensive to make, are heavy, and unless they are made of the more expensive stainless steel, they are subject to rusting and to the corrosive action of chemicals that may be transported in the hopper cars. Fiberglass covers are extremely light weight and flexible, making it difficult to maintain a suitable seal between the hatch cover and the hatch.

Hatch covers, particularly round hatch covers, are made with a variety of known sealing mechanisms. For example, round hatch covers may be sealed using the Mon-O-Wheel hatch as is illustrated at page 180 of the "Car and Locomotive Cyclopedia". Also known in the art, as is illustrated at page 188 of the "Car and Locomotive Cyclopedia" are hatch covers having a locking arm traversing the diameter thereof. When hatch covers having a locking arm are made of steel, the covers are heavy and are labor intensive to produce, since the locking arm must be riveted to the lid. When such hatch covers are made of fiberglass, although a good seal can be obtained at the two ends of the locking arm, a strong seal cannot be obtained at the edges of the hatch remote from the locking arm because of the flexibility of the fiberglass.

U.S. Pat. No. 4,126,094, issued to Zimmerle et al on Nov. 21, 1978, also shows a hatch cover and holding bar of conventional design.

Applicant has also filed, as sole or co-inventor, the following applications relating to hatch covers and hold-down bars:
Ser. No. 412,416, filed 08/27/82
Ser. No. 456,154, filed 01/06/83
Ser. No. 459,067, filed 01/19/83
Ser. No. 459,069, filed 01/19/83
Ser. No. 459,273, filed 01/19/83
Ser. No. 462,730, filed 01/31/83

Accordingly, there is a need in the art for a hatch cover which is easy and inexpensive to build, is relatively light in weight, has sufficient rigidity to provide uniform pressure around the perimeter thereof when locked in the closed position to provide a good seal, is resistant to corrosion, and is not labor intensive to build.

Reaction injection molding is known in the art as is illustrated by "Plastics Technology", pages 33–44, March 1983. In reaction injection molding, at least two materials which react to each other to form a polymer are separately, and simultaneously, injected into a mold of the desired shape, said chemicals being mixed as they are injected into the mold. Since the chemicals that create the polymer react chemically with one another on contact, a curing step is not required to produce a stable polymeric material. The reactive chemicals used to make the polymer must be chosen so that the final polymeric material has the properties desired. Typically, no releasing agents are required since heat is not required for a cure, and the polymer produced by the technique, in most cases, can easily be removed from the mold.

SUMMARY OF THE INVENTION

The present invention relates to a hatch cover for a hopper car which comprises a lid having an outside surface and an inside surface, and a rim defining the outside edge of the inside surface. A locking arm is provided which traverses the geometric center of the outside surface and is attached to the lid. The improvement in the hatch cover of the invention comprises making said cover substantially of an organic polymeric material. The hatch cover of the invention is also characterized in having a substantially flat piece of metal embedded in the lid, said flat piece of metal having its geometric center substantially coincident with the geometric center of the lid. The flat piece of metal provides reinforcement in the lid and helps distribute forces from the locking arm incrementally throughout the polymeric material. A metal channel which has the shape of and a length similar to the length of the locking arm is embedded in the locking arm, said channel providing reinforcement for the locking arm. Attaching means are provided for attaching the flat piece of metal in the lid to the channel in the locking arm. The attaching means comprises a bolt which is welded to the channel in the locking arm and passes through a hole substantially in the geometric center of the flat piece of metal, and a nut threaded on to the end of the bolt. A bracket is molded into the outside surface of the lid to provide lateral support for the locking arm. A gasket may be secured to the inside surface of the lid adjacent to the rim to provide a seal when the hatch cover is in use and is closed. Preferably, the polymeric material used to make such hatch cover will be reaction injection molded polyurethane or reaction injection molded nylon.

A method of making a hatch cover is provided which comprises the steps of forming a lid having an outside surface and an inside surface and a rim defining the outside edge of said inside surface, providing a locking arm for traversing the geometric center of the outside surface, and attaching said locking arm to said lid. The improvement in the method comprises the step of making said hatch cover substantially of an organic polymeric material. The method further comprises the steps of embedding a flat piece of metal in the lid, and disposing said piece of metal such that the geometric center thereof is substantially coincident with the geometric center of the lid, said piece of metal providing reinforcement in the lid and distributing the forces applied by the locking arm, when the hatch is closed, incrementally throughout the polymeric material of the lid. The method further comprises the step of embedding a metal channel in the locking arm to provide reinforcement for said locking arm, and forming the metal channel to have a shape and length similar to the shape and length of the locking arm. In the method of the invention, the flat piece of metal embedded in the lid is attached to the channel in the locking arm using attaching means comprising a bolt, said bolt being welded to said channel, which is inserted in a hole in said channel and through a hole substantially in the geometric center of the flat piece of metal in the lid, and a nut which is threaded onto the end of the bolt. The method further comprises the step of molding a bracket onto the outside surface of the lid, said bracket providing lateral support for the locking arm. An elastomeric gasket may be secured to the inside surface of the lid adjacent to the rim, said gasket providing a seal when said hatch cover is in use and is closed. In the method of the invention, the lid and locking arm of the hatch cover are made by reaction injection molding a polymeric material around the flat piece of metal and around the channel respectively. Preferably, the hatch cover of the invention will be made of polyurethane or nylon and will be made in a round shape.

BRIEF DESCRIPTION OF THE DRAWINGS

The accompanying drawings illustrate a present preferred embodiment of the invention, in which.

DESCRIPTION OF THE ILLUSTRATED EMBODIMENTS

Figure 1:
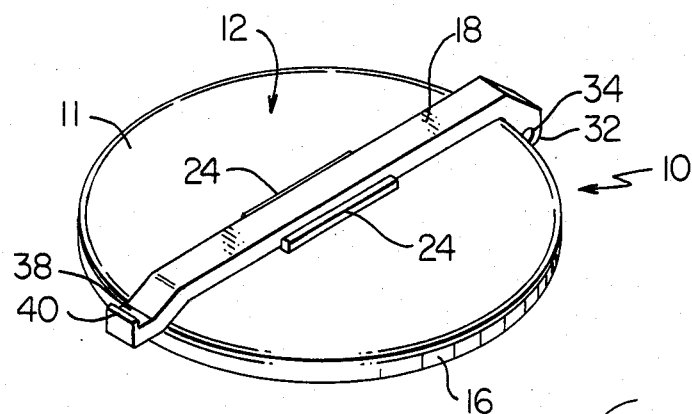
FIG. 1 illustrates a top perspective view of a hatch cover of the invention.

Reference is now made to FIG. 1 which illustrates a perspective view of the hatch cover of the invention which is generally represented by the reference number 10. The hatch cover 10 comprises a lid 11 having outside surface 12, inside surface 14 (FIG. 2), a rim 16 which defines the outside edge of the inside surface, and a locking arm 18. In the illustrated embodiment, the locking arm traverses the diameter of lid 11 and is fixedly attached thereto, adjacent outside surface 12.

Although, in the illustrated embodiment, the hatch cover of the invention is shown to have a round configuration, it will be recognized by those skilled in the art that a hatch cover according to the present invention may be provided in other desired shapes.

Figure 2:
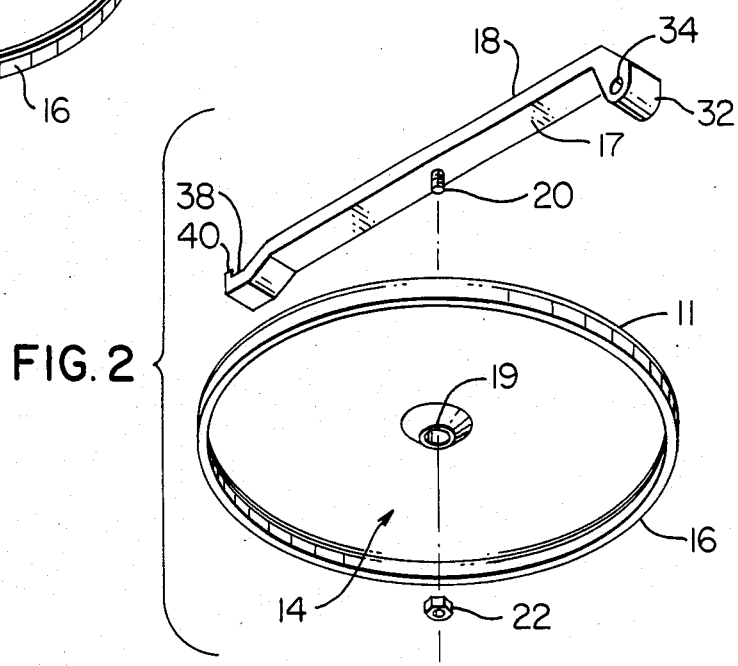
FIG. 2 illustrates a bottom perspective exploded view of a hatch cover of the invention.

Reference is now made to FIG. 2 which illustrates the preferred method of attaching locking arm 18 to lid 11. In the preferred embodiment of the invention, bolt 20, which has been embedded into locking arm 18 so that the threaded end thereof extends from underside 17 of locking arm 18, is inserted into hole 19 of lid 11, and nut 22 is threaded onto the end thereof.

When it is used, the hatch cover of the invention is attached to the top of a railroad hopper car, a tank truck, a storage tank, or any other device in which such a hatch cover can be used, by means of end 32, which has hole 34 therein, which is adapted for receiving a pin (not shown), said end 32, hole 34, and said pin comprising a hinge on which hatch cover 10 rotates when opening or closing the hatch cover. When in the closed position, the hatch cover is sealed by a locking mechanism which contacts the locking arm at flat surface 38. Although a large number of locking mechanisms are known in the art, it is preferred that the locking mechanism which is used with the hatch cover of the present invention be a type in which a U-shaped clamp fits over protruding edge 40 of the locking arm 18. In the preferred embodiment of the invention, hatch cover 10 is provided with a gasket 29 (FIG. 3) which may be attached to the inside surface of lid 11 adjacent to rim 16. When in the closed position, the U-shaped hatch lock applies pressure to flat surface 38 of locking arm 18, and locking arm 18 distributes the pressure applied by the locking arm throughout lid 11 as is described below, such that the locking pressure is distributed equally on all areas of gasket 29 to provide a good seal when the hatch cover is closed.

To assure that the pressures applied on the locking arm are distributed evenly to gasket 29, lid 11 is provided with brackets 24 on the outside surface thereof and disposed on both sides of the locking arm to prevent play in the locking arm and to prevent lid 11 from rotating on bolt 20. Bracket 24 is preferably molded into the outside surface 12 of lid 11 when lid 11 is made, and is an integral part thereof.

Figure 3:
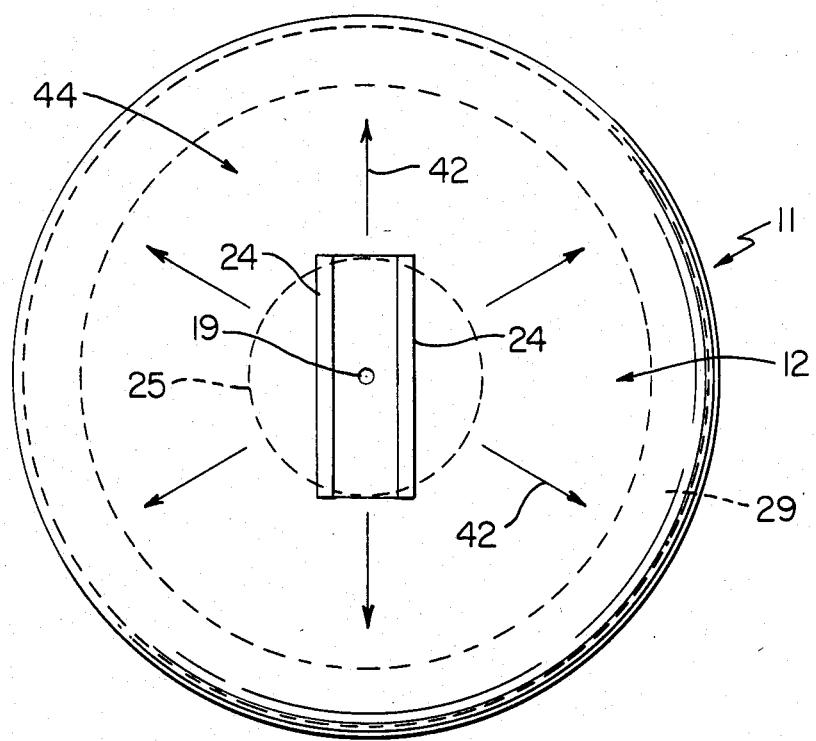
FIG. 3 illustrates a top view of the lid of the hatch cover of the invention.

Reference is now made to FIG. 3 which illustrates a top view of lid 11. In the preferred embodiment of the invention, a substantially circular flat piece of metal 25, having the geometric center thereof substantially coincident with the geometric center of lid 11, is embedded into lid 11 when it is made. The piece 25 thus acts as a reinforcing member for lid 11, and in the preferred embodiment, provides the primary attachment, through threaded hole 19, of lid 11 to locking arm 18. Flat piece of metal 25 also helps provide a good seal when hatch cover 10 is closed since, when downward pressures are applied by locking arm 18, metal 25 helps distribute the forces applied by locking arm 18 incrementally throughout polymer 44 of lid 11 substantially in the directions represented by arrows 42. Since the locking pressure which is applied to locking arm 18 is evenly distributed, a good seal is provided at all points on gasket 29.

Figure 4:
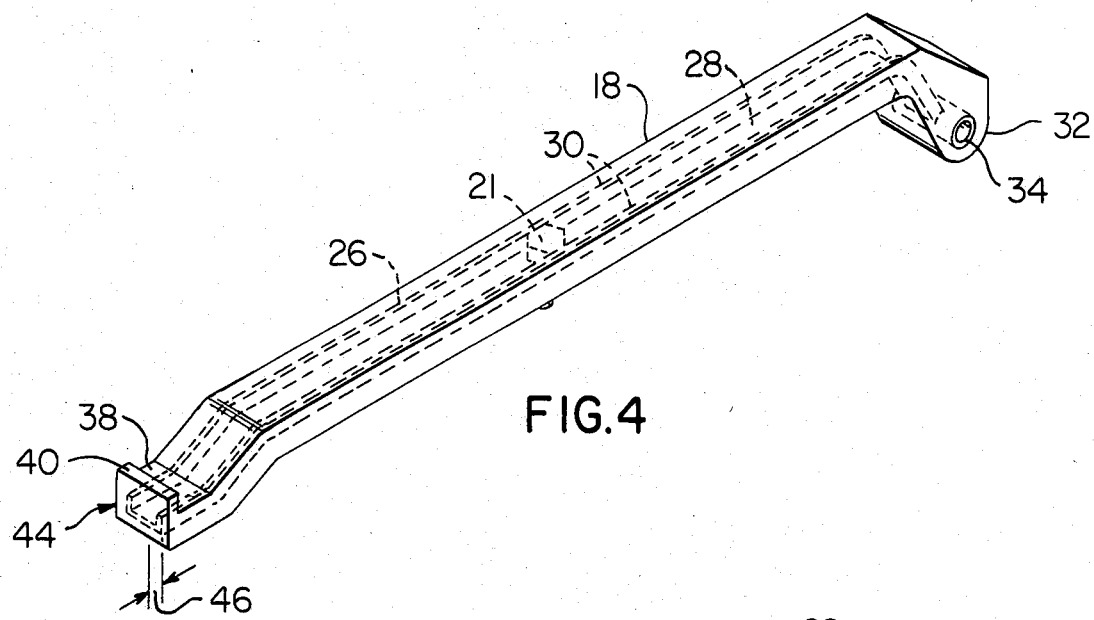
FIG. 4 illustrates a perspective view of the locking arm of the hatch cover of the invention.
Figure 5:
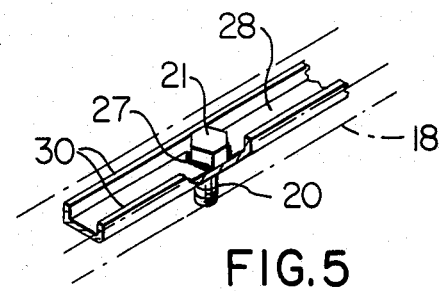
FIG. 5 is a partial view of the locking arm of the invention which illustrates the means of attaching the bolt to the channel.

In those cases in which a strong pressure seal is required, such as when volatile chemicals are transported in a hopper car, it is necessary that locking arm 18 have considerable structural strength to withstand the pressures required by the locking mechanism in providing such a pressure seal. In the preferred embodiment of the invention illustrated in FIG. 4, the locking arm 18 has a metal channel, 26 embedded therein to provide reinforcement therefor. Channel 26 is bent in the shape of the locking arm 18 and is of substantially the same length, the difference in length between locking arm 18 and channel 26 being only the width 46 of polymer 44 which covers the ends of channel 26. Channel 26 has a flat surface 28 which provides lateral reinforcement for locking arm 18, and sidewalls 30 which provide vertical reinforcement for locking arm 18. In the preferred embodiment, head 21 of bolt 20 is fixed to channel 26 by weld 27 as is illustrated in FIG. 5. The channel 26 is disposed in locking arm 18 such that the pressure applied by the U-shaped hatch lock is applied indirectly to channel 26 when the hatch lock is closed on locking arm 18.

Figure 6:
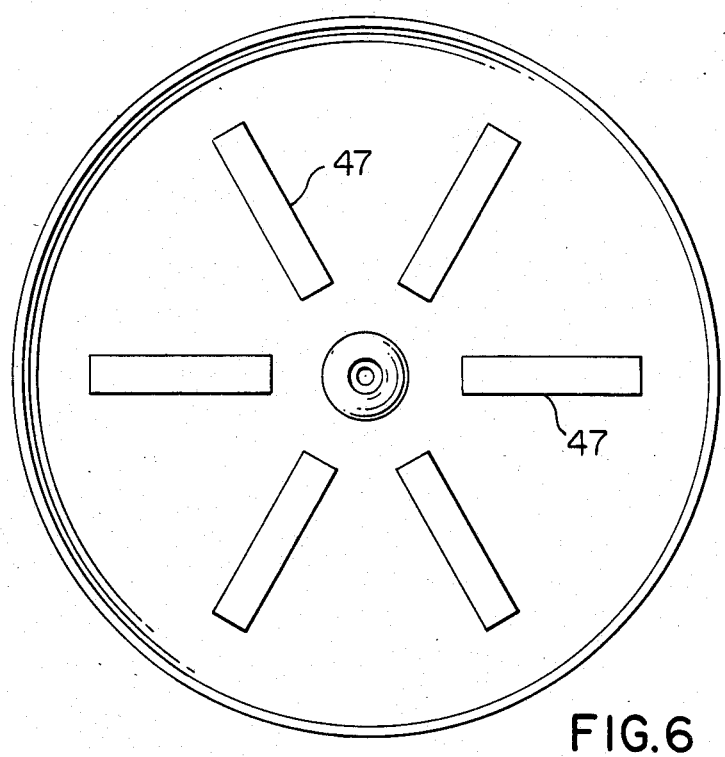
FIG. 6 illustrates an alternative construction for the lid of the hatch cover of the invention.

Although in the preferred embodiment, it is illustrated that metal reinforcing means are provided in the lid and locking arm of the hatch cover of the invention, it will be recognized by those skilled in the art that other means of reinforcement may be used to provide a suitable hatch cover which is made substantially of polymeric materials. For example, as is illustrated in FIG. 6, reinforcement ribs 47 may be molded into a lid to provide radial reinforcement therefor. Also, the hatch cover of the invention can be made using fiber reinforcement, or the hatch cover can be made using more rigid composite materials. Other means of providing reinforcement will be readily apparent to those skilled in the art.

Although many methods are known for molding polymeric materials into a shape, and any such method that is suitable can be used to make the hatch cover of the present invention, it has been found to be particularly advantageous to make the hatch cover of the invention using the reaction injection molding method. In the reaction injection molding technique, as is well known in the art, two or more chemicals, which when mixed together form a polymer, are chosen to produce a polymer having the desired properties. In the reaction injection molding technique, the chemicals are injected into a mold through a mixing head which keeps the chemicals separate until they are mixed in the mold. Since the polymer which is made by this technique results from a chemical reaction between the two chemicals, no curing step is required to shape the polymer to the mold. Since no curing step is required, ordinarily the polymer made by such a technique can be easily taken from the mold without the use of releasing agents. The reaction injection molding technique also reduces the need for using a large amount of energy, which may be required in other conventional molding techniques, to produce a stable polymeric product. A number of reaction injection molding chemical systems have been well characterized in the art as is illustrated by "Plastics Technology", March 1983, pages 37–44. Mixing heads which are used in the technique are readily available from, for example, Cannon USA Inc., PU Processing Equipment, 129 Commonwealth Drive, P.O. Box 730, Warrendale, PA 15095.

For the hatch covers of the present invention, it is preferable to provide a mold having a round shape for the production of the lid of the hatch cover of the invention, said mold providing for the rim and bracket of said lid to be integrally molded onto the lid. In the method of the invention, the reinforcing member 25 is placed in the center of the mold, and the reaction injection molding chemicals are sprayed into the mold, surrounding and embedding the reinforcing member. Since the chemical reaction is ordinarily very fast, the polymer will be set up in the mold within 6 seconds to 60 minutes, depending on the chemicals used. The mold need only be opened, and the completed lid removed with the reinforcing member embedded therein. In the method of the invention, it is preferred that the polymer which is used to make the hatch cover of the invention be a polyurethane or a nylon. Accordingly, when a polyurethane hatch cover is made, one of the chemicals which will be used to make the polymer will be in isocyanate, with a conventional reactive counterpart. When it is desired to make the hatch cover of a nylon material, one of the chemicals will be an amide, with its conventional reactive counterpart. The relative concentration of the two reactive chemicals will, in part, determine the physical properties of the completed polymer.

In a similar manner, in making the locking arm of the hatch cover of the invention, the angle-iron or channel, after the bolt has been welded thereto, is suspended in a mold having the desired shape, and the chemicals required to produce the polymer are injected into the mold.

Using the technique and the chemicals described, a hatch cover which is light in weight, and has great strength and rigidity can be made. According to the present invention, inexpensive materials, as compared with the aluminum and steel of the prior art, can be used to make a high quality hatch cover, and the amount of labor required to make such a hatch cover is substantially reduced over those of the prior art since the need for high temperature casting, riveting and burring are avoided. Also, since the polyurethane or nylon used in the hatch cover of the present invention can be made having great rigidity, and because reinforcing members can be used in the locking arm and in the lid without using additional labor, a hatch cover having great strength, as compared to fiberglass hatch covers, which provide a good seal on the hatch, can be provided.

While present embodiments of this invention and methods of practicing the same have been illustrated and described, it will be recognized that this invention may be variously embodied and practiced within the scope of the following claims.

What is claimed is:

1. In a hatch cover for a hopper car comprising a substantially circular lid having an outside surface and an inside surface and a rim defining the outside edge of said inside surface, and a locking arm traversing a geometric center of said outside surface and being fixedly attached to said lid, said arm having opposed ends respectively extending beyond said rim of said lid and having a certain width at said geometric center, the improvement wherein said cover is made substantially of polymeric material and has a substantially flat circular reinforcing member embedded therein, said reinforcing member having a geometric center thereof substantially coincident with said geometric center of said lid and having a diameter that is larger than said certain width of said arm whereby said member provides reinforcement for said lid and distributes the forces applied by the locking arm incrementally throughout the polymeric material of said lid when said hatch cover is closed, said arm also being made substantially of polymeric material and having a U-shaped metal channel embedded therein for reinforcement thereof, said channel being formed in the shape of said locking arm and having approximately the same length thereof, and means for attaching said reinforcing member to said channel in said locking arm, said attaching means comprising a bolt which passes through said channel and through a hole substantially in said geometric center of said reinforcing member, and a nut threaded onto the end of said bolt, said bolt being secured to said channel.

2. The hatch cover of claim 1 in which a bracket is molded into the outside surface of said lid to provide lateral support for said locking arm, said locking arm and said reinforcing member providing an even distribution of pressure on said lid.

3. The hatch cover of claim 1 in which an elastomeric gasket is secured to said inside surface adjacent to said rim to provide a seal when said hatch cover is in use and is closed.

4. The hatch cover of claim 1 in which the polymeric material is reaction injection molded polyurethane.

5. The hatch cover of claim 1 in which the polymeric material is reaction injection molded nylon.

* * * * *